H. M. P. MURPHY.
FLUID PRESSURE REDUCING VALVE.
APPLICATION FILED MAR. 21, 1908.
1,071,777.
Patented Sept. 2, 1913.
2 SHEETS—SHEET 1.
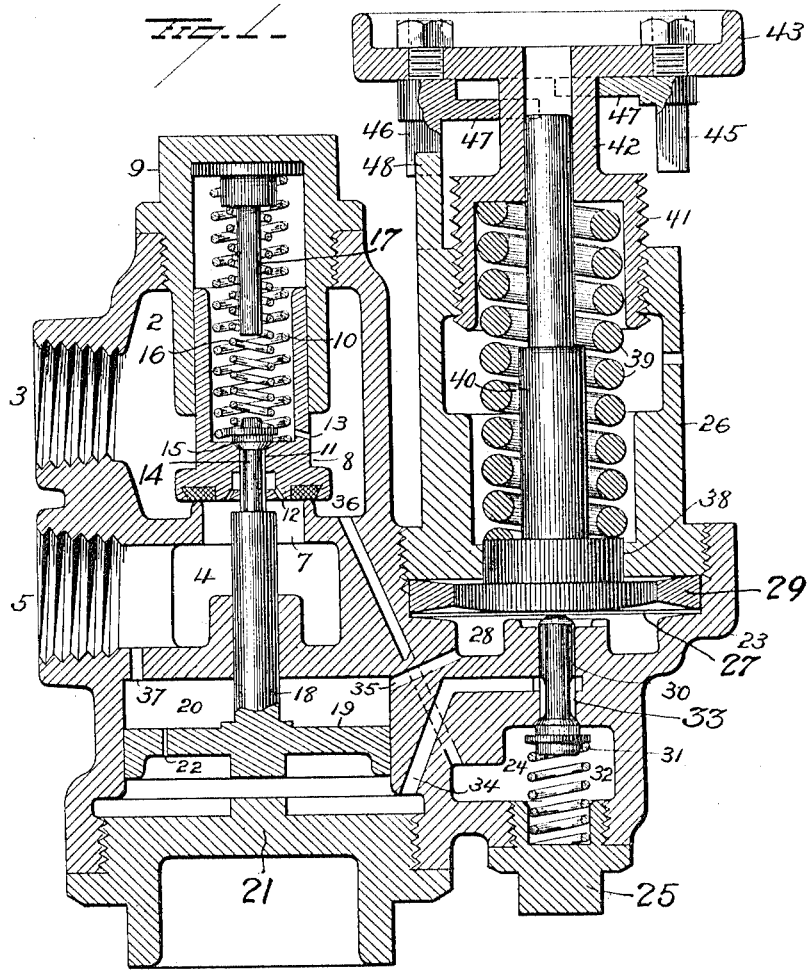
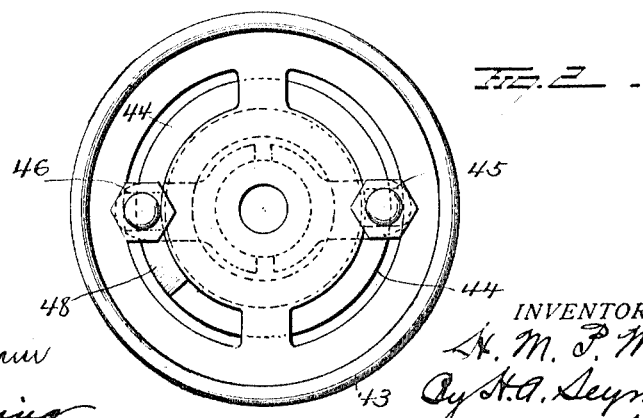
WITNESSES
INVENTOR
H. M. P. Murphy
By H. A. Seymour
Attorney H. M. P. MURPHY.
FLUID PRESSURE REDUCING VALVE.
APPLICATION FILED MAR. 21, 1908.
1,071,777.
Patented Sept. 2, 1913.
2 SHEETS—SHEET 2.
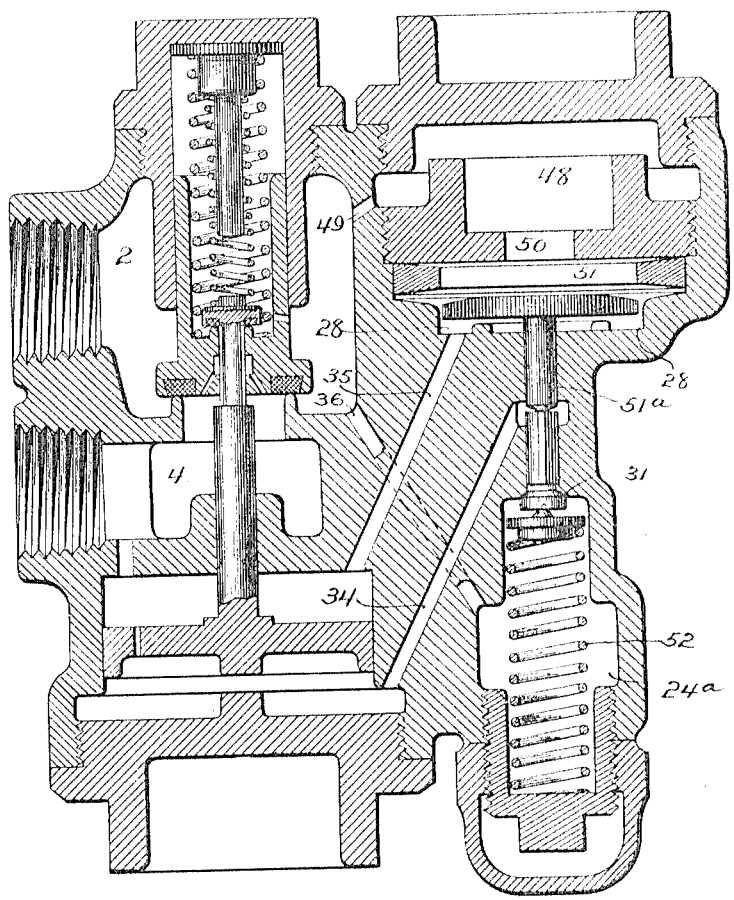
WITNESSES
E. J. Nottingham
G. F. Downing
INVENTOR
H. M. P. Murphy
By H. A. Seymour
Attorney

UNITED STATES PATENT OFFICE.

HOWARD M. P. MURPHY, OF PITTSBURGH, PENNSYLVANIA, ASSIGNOR, BY DIRECT AND MESNE ASSIGNMENTS, TO THE WESTINGHOUSE AIR BRAKE COMPANY, OF PITTSBURGH, PENNSYLVANIA, A CORPORATION OF PENNSYLVANIA.

FLUID-PRESSURE-REDUCING VALVE.

1,071,777.     Specification of Letters Patent.     Patented Sept. 2, 1913.

Application filed March 21, 1908. Serial No. 422,533.

*To all whom it may concern:*

Be it known that I, HOWARD M. P. MURPHY, a resident of Pittsburgh, in the county of Allegheny and State of Pennsylvania, have invented certain new and useful Improvements in Fluid - Pressure - Reducing Valves; and I do hereby declare the following to be a full, clear, and exact description of the invention, such as will enable others skilled in the art to which it appertains to make and use the same.

This invention relates to improvements in fluid pressure reducing valves such as are adaptable for use with any apparatus wherein it is desirable to maintain a working pressure which shall be less than that of the main source of supply.

The object of the invention is to provide a valve mechanism which will operate to reduce the pressure of a fluid from a high to a lower degree and insure the maintenance of the reduced pressure constant.

A further object is to provide a reducing valve mechanism of high capacity and yet occupy but small space, and which at the same time shall be very sensitive.

A further object is to so construct the device that it can be readily and accurately adjusted to cause the maintenance of different degrees of reduced pressure.

A further object is to provide a reducing valve which shall be simple in construction, and which shall be accurate and effectual in the performance of all the functions which may be required of it.

With these objects in view, the invention consists in certain novel features of construction and combinations and arrangements of parts as hereinafter set forth and pointed out in the claims.

In the accompanying drawings: Figure 1 is a sectional view of a reducing valve mechanism embodying my improvements; Fig. 2 a plan view showing the pressure adjusting devices; and Fig. 3 a sectional view of a valve mechanism embodying certain modifications.

While my improvements are adaptable for use in any connection where a reduction of fluid pressure is desirable, still for the sake of convenience and simplicity, I will describe the same as applied in an air brake system.

1 represents a casing having a chamber 2 provided with an inlet port 3, with which a pipe from the main air reservoir may be connected. The casing is also made with a chamber 4 having a port 5 with which a pipe, leading to a reservoir for reduced pressure, may be connected. A passage 7 connects the chambers 2 and 4 and this passage is closed by a valve 8. A tubular cap 9 is secured to the top of the casing and depends some distance into the chamber 2, said cap serving to receive and guide the valve 8, which latter is also made tubular or hollow throughout a portion of its length. A spring 10 is located within the hollow valve 8 and tubular cap 9 and serves to press the former upon its seat. The lower end of the valve is made with a passage 11 communicating at its lower end with the passage 7, and ducts 12 in the lower portion of the valve 8 also communicate with said passages 7 and 11. A small duct 13 may be provided to connect the interior of the valve with the chamber 2, said ducts and passages permitting a flow of fluid (as hereinafter explained) from the high pressure side of valve 8 to the low pressure chamber 4 to balance the valve 8 under certain conditions during the operation of the mechanism.

A stem 14 passes freely through the passage 11 and is provided at its upper end with a valve 15 to close said passage. The valve 15 is pressed upon its seat by means of a light spring 16 located within the spring 10 and maintained in proper position by means of a pin 17 depending from the closed upper end of the cap 9.

The stem 14 of valve 15 projects upwardly from a rod 18, the latter passing downwardly through the bottom of the low pressure chamber 4 and provided at its lower end with a piston 19 located within a controlling chamber 20. The bottom of which may be conveniently formed by a cap or plug 21 screwed into the bottom of the casing. The piston 19 may be provided with a small duct 22 connecting the portion of the chamber 20 above the piston with the portion below the same, for a purpose which will be hereinafter made apparent.

The casing 1 is made at its lower end with a laterally projecting portion 23, having therein a chamber 24, closed at its lower end by means of a cap or plug 25.

A barrel or cylinder 26 is screwed into the laterally projecting portion 23 of the casing, and below this barrel or cylinder, a thin metal diaphragm 27 is located and forms the top of a chamber 28. The diaphragm 27 (which is intended to have very slight movement) is held upon its seat over the chamber 28 by means of a beveled ring 29, the latter being held in place by contact of the lower end of the barrel 26 therewith.

A passage connects the chambers 24 and 28, and in this passage, a stem 30 is located and provided at its lower end with a valve 31 for closing said passage. A spring 32 presses this valve toward its seat. The stem 30 is grooved to form ports 33 with which one end of a duct 34 communicates, and the other end of this duct communicates with the chamber 20 below the piston 19 therein. A duct 35 connects the upper portion of the chamber 20 with the chamber 28 under the diaphragm 27. The high pressure chamber 2 is connected by means of a duct 36 with the chamber 24 in the lateral portion of the casing, while the low pressure chamber 4 is connected with the chamber 20 by means of a short duct 37.

A head 38 is movable in the lower end of the barrel 26 and in the ring 29 and is forced down upon the diaphragm 27 by means of a spring 39, encircling a rod 40 projecting upwardly from the head 38. The spring 39 bears at its lower end upon the head 38 and at its upper end is seated in an adjustable inverted cup 41, screwed into the upper end of the barrel 26. The inverted cup 41 is provided with a tubular shank 42 in which the upper end of the rod 40 is guided and the upper end of said shank is provided with a hand wheel 43 by means of which the cup can be turned for the purpose of adjusting the tension of the spring 39, and consequently the amount of fluid pressure within the chamber 28 to raise the diaphragm against the resistance of said spring. In order to be enabled to accurately adjust the tension of the spring 39 within predetermined limits, the devices now to be described may be employed: The hand wheel 43 is provided with two curved slots 44 in which tappets 45—46 are adjustably secured, and in order to prevent said tappets from turning, they are provided with bifurcated arms 47 which embrace the shank 42. The barrel 26 is provided at its upper end with a lug or stop 48 to be engaged by one or the other of the tappets, whereby the tension of the spring 39 can be adjusted between predetermined limits, according to the positions at which the tappets may be set in the slots of the hand wheel 43.

Let it be assumed that there is no pressure in the pipes connected with the low pressure chamber 4. The diaphragm 27 will now be pressed downwardly with the full force of the spring 39 and hence the valve 31 will be pushed slightly off its seat. Should fluid pressure from a main reservoir be now admitted to the high pressure chamber 2, the fluid under high pressure will flow through the duct 36 and enter the chamber 24, from which it will pass through the ducts 33 and 34 to the chamber 20 below the piston 19. The pressure thus admitted under the piston 19 will move the latter upwardly and cause the valve 15 to rise slightly from its seat. Fluid under pressure is thereupon vented from the spring chamber of the valve 15 through the ducts 13, 11, and 12 to the low pressure chamber 4. By reason of the restricted size of the port 13 leading to the spring chamber and forming communication from the high pressure chamber 2, it will be evident that the flow of air past the open valve 15 will exceed the flow of air through the restricted port 13 and consequently the pressure acting to hold the valve 8 on its seat is reduced so that the opposing pressures on the valve are nearly balanced, the area of the piston portion of the valve 8 which extends into the spring chamber being somewhat larger than the area of the port opening controlled by the valve. The fluid pressures on opposite sides of the valve 8 being nearly balanced, the parts are in condition to be operated by a slight differential of pressures on the operating abutment 19. As the pressure within the chamber 20 under the piston 19 continues to increase, the latter will continue to rise,—finally causing the upper end of the rod 18 to engage the lower end of the valve 8 and raise the latter to admit fluid from the high pressure chamber 2, through the passage 7 to the low pressure or outlet chamber 4. Fluid will also pass from the low pressure chamber, through the duct 37 to the chamber 20 over the piston 19 and tend (under certain conditions) to balance said piston against the pressure under it, such balancing being assisted by the passage of fluid through the small duct 22 in said piston. From the upper portion of chamber 20, fluid will pass through the duct 35 to the chamber 28 under the diaphragm 27. When the pressure in the chamber 28 (and hence in the low or outlet pressure chamber 4) approaches the pressure for which the tension of the spring 39 has been adjusted, the diaphragm 27 will be raised gradually against the resistance of said spring, and the valve 31 will become closed by this action. Pressure above and below the piston 19 will become equalized, and the valves 8 and 15 will be closed by the action of the springs 10 and 16.

From the above description, it will be seen that as soon as the low or outlet pressure falls below the predetermined degree as determined by the spring 39, the valves will be operated in the manner before explained, and the pressure will be augmented by fluid from the high pressure chamber and the main reservoir, and hence the outlet pressure will be maintained constant.

It is apparent that the degree of reduced pressure to be maintained can be accurately controlled by adjusting the tension of the spring 39 in the manner before explained.

In the construction shown in Fig. 3, the constant maintenance of a predetermined degree of reduced pressure, is controlled by the combined action of fluid pressure from the main or high pressure supply, and an adjustable spring, instead of by means of a spring such as the spring 39. In the modified construction, the barrel 26 is displaced by a chamber 48 which communicates, by a duct 49 with the high pressure chamber 2, and below said chamber 48, the diphragm 27 is located and is acted upon by pressure passing through a passage 50 in the bottom of chamber 48. A head 51 is located in the chamber 28 immediately under the diaphragm 27 and provided with a depending stem 51ª, the lower end of which is engaged by the upper end of the stem of valve 31. A spring 52 presses the valve 31 toward its seat and the head 51 against the under face of the diaphragm. The spring 52 is located in chamber 24ª with which the duct 36 communicates, and the lower end of said spring is supported by a nut 53, by means of which latter, the tension of the spring can be adjusted.

Fluid from the high pressure chamber 2 will be admitted to the lower pressure chamber 4 while the valve 31 is kept open by the action of the high pressure fluid in chamber 48 until the pressure in the chamber 28 (which receives pressure from the low pressure chamber 4) approaches the predetermined pressure for the service reservoir, when the diaphragm 27 will be raised by the combined force of spring 52 and the low pressure fluid in chamber 28 and the valve 31 will thus be closed.

Fluctuations of pressure or outlet in the low pressure chamber 20, will cause the operation of the mechanism as before explained.

Having fully described my invention what I claim as new and desire to secure by Letters-Patent, is:—

1. A fluid pressure regulator comprising a main valve subject on one side to the outlet or low pressure and on the opposite side to the pressure of a chamber having a restricted port communicating with the inlet or high pressure, a movable abutment for operating said valve, a regulating valve mechanism governed by the outlet pressure for controlling the operation of said abutment, and an auxiliary valve carried by said abutment and operated upon the preliminary movement thereof for venting fluid from said chamber.

2. A fluid pressure regulator comprising a main valve subject on one side to the outlet or low pressure and on the opposite side to the pressure of a chamber having a restricted communication with the inlet or high pressure, a stem carried by said valve having a piston fit in said chamber, a piston for operating said valve, a regulating valve mechanism governed by the outlet pressure for controlling the operation of said abutment, and an auxiliary valve mounted in said main valve and operated by said piston upon the initial movement thereof for venting fluid from said chamber to the low pressure side of the main valve.

3. In a reducing valve, the combination with a casing having a high pressure chamber and a low pressure chamber, of a main valve to control communication between said chambers, said main valve having ducts connecting said chambers, a spring-pressed relief valve for closing said ducts, a stem projecting from said relief valve and depending below the main valve, a piston, a rod projecting from said piston and terminating under the stem of the relief valve, and means for operating said piston to cause its rod to first raise the relief valve and subsequently raise the main valve.

4. In a reducing valve, the combination with a casing having a high pressure chamber, a low pressure chamber and a controlling chamber communicating with the low pressure chamber, and a valve for controlling communication between the high and low pressure chambers, of a piston in the controlling chamber, a rod projecting from said piston adapted to unseat the valve, means of communication between the high pressure chamber and the controlling chamber below the piston in the latter, a valve in said means of communication, a spring tending to open said last mentioned valve, means for opposing the resistance of said spring with reduced fluid pressure, an adjustable abutment for one end of said spring whereby the tension of the latter can be adjusted, a hand wheel carried by said abutment and provided with elongated slots, tappets provided with shanks adjustable in said slots, and a fixed stop to be engaged by said tappets, whereby the tension of said spring can be adjusted within predetermined limits.

In testimony whereof, I have signed this specification in the presence of two subscribing witnesses.

HOWARD M. P. MURPHY.

Witnesses:
A. N. MITCHELL,
R. S. FERGUSON.